US010066358B2

(12) United States Patent
Ota et al.

(10) Patent No.: US 10,066,358 B2
(45) Date of Patent: Sep. 4, 2018

(54) HYBRID-TYPE WORKING MACHINE

(71) Applicant: Hitachi Construction Machinery Co., Ltd., Taito-ku, Tokyo (JP)

(72) Inventors: Yasunori Ota, Tsuchiura (JP); Mitsugu Ojima, Tsuchiura (JP); Shuji Egawa, Tsuchiura (JP); Yuji Azuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 41 days.

(21) Appl. No.: 15/329,755

(22) PCT Filed: Jul. 13, 2015

(86) PCT No.: PCT/JP2015/070012
§ 371 (c)(1),
(2) Date: Jan. 27, 2017

(87) PCT Pub. No.: WO2016/017409
PCT Pub. Date: Feb. 4, 2016

(65) Prior Publication Data
US 2017/0226715 A1 Aug. 10, 2017

(30) Foreign Application Priority Data
Jul. 28, 2014 (JP) .................. 2014-152860

(51) Int. Cl.
*E02F 3/32* (2006.01)
*E02F 9/22* (2006.01)
(Continued)

(52) U.S. Cl.
CPC .................. *E02F 3/32* (2013.01); *B60K 6/44* (2013.01); *B60K 11/04* (2013.01); *E02F 9/0858* (2013.01);
(Continued)

(58) Field of Classification Search
CPC ........ E02F 3/04–3/439; E02F 9/0858–9/0891; E02F 9/18; E02F 9/2058–9/2091; F01P 3/20; F01P 5/02
See application file for complete search history.

(56) References Cited

U.S. PATENT DOCUMENTS 9,790,662 B2 * 10/2017 Ota .................. E02F 9/2075
2007/0090650 A1 * 4/2007 Komiyama ........... E02F 9/0866
290/400

(Continued)

FOREIGN PATENT DOCUMENTS

JP 2011-21431 A 2/2011
JP 2012-41819 A 3/2012
(Continued)

OTHER PUBLICATIONS

International Search Report (PCT/ISA/220 & PCT/ISA/210) issued in PCT Application No. PCT/JP2015/070012 dated Sep. 8, 2015 with English translation (seven pages).
(Continued)

Primary Examiner — Erez Gurari
(74) Attorney, Agent, or Firm — Crowell & Moring LLP

(57) ABSTRACT

There are provided an electric motor (12) that is driven by an engine (8) to generate electric power or assists in a drive of the engine (8) by supply of electric power thereto, a heat exchanger (13) to which cooling air is supplied by a cooling fan (8A), a heat exchanger upstream room (28) that is positioned upstream of the heat exchanger (13) in a flow direction of the cooling air supplied to the heat exchanger (13), and an electricity storage device (30) that stores or discharges electric power. In addition, a radiator (42) for electricity storage device, a cooling pump (43) for electricity storage device and a cooling line (44) for electricity storage device configure a cooling system (41) for electricity storage device that independently cools the electricity storage device (Continued)

(30) aside from the inverter device (34), and the cooling system (41) for electricity storage device is arranged in the heat exchanger upstream room (28).

4 Claims, 10 Drawing Sheets

(51) Int. Cl.
| | |
|---|---|
| *E02F 9/20* | (2006.01) |
| *E02F 9/08* | (2006.01) |
| *E02F 9/18* | (2006.01) |
| *B60K 6/44* | (2007.10) |
| *B60K 11/04* | (2006.01) |
| *F02B 63/04* | (2006.01) |
| *F02B 63/06* | (2006.01) |
| *F01P 5/02* | (2006.01) |
| *F01P 3/20* | (2006.01) |

(52) U.S. Cl.
CPC .......... *E02F 9/0866* (2013.01); *E02F 9/0883* (2013.01); *E02F 9/18* (2013.01); *E02F 9/2091* (2013.01); *E02F 9/2296* (2013.01); *F01P 3/20* (2013.01); *F01P 5/02* (2013.01); *F02B 63/04* (2013.01); *F02B 63/06* (2013.01); *F01P 2050/24* (2013.01)

(56) References Cited

U.S. PATENT DOCUMENTS

| | | | | |
|---|---|---|---|---|
| 2009/0199553 | A1* | 8/2009 | Nishimura | E02F 9/0866 60/486 |
| 2010/0224426 | A1* | 9/2010 | Shinnada | E02F 3/3414 180/6.5 |
| 2010/0294578 | A1* | 11/2010 | Shimomura | B60K 1/04 180/65.21 |
| 2010/0297926 | A1* | 11/2010 | Shimomura | B60K 1/04 454/141 |
| 2012/0285757 | A1* | 11/2012 | Atarashi | B60K 1/04 180/68.1 |
| 2013/0115037 | A1* | 5/2013 | Kinoshita | B62D 25/10 414/687 |
| 2013/0133962 | A1* | 5/2013 | Watanabe | E02F 9/26 180/65.26 |
| 2013/0220720 | A1* | 8/2013 | Iizuka | B60K 5/12 180/65.26 |
| 2013/0253781 | A1* | 9/2013 | Li | B60L 8/003 701/50 |
| 2013/0299256 | A1 | 11/2013 | Yamashita | |
| 2014/0021781 | A1* | 1/2014 | Satake | E02F 9/0858 307/9.1 |
| 2015/0032314 | A1* | 1/2015 | Kitamura | E02F 9/123 701/22 |
| 2015/0345110 | A1* | 12/2015 | Takeuchi | H01M 2/1083 180/65.21 |
| 2016/0257293 | A1* | 9/2016 | Takahashi | H02J 7/0091 |
| 2017/0016206 | A1* | 1/2017 | Ota | E02F 9/123 |
| 2017/0067227 | A1* | 3/2017 | Ota | B60K 1/04 |
| 2017/0226715 | A1* | 8/2017 | Ota | E02F 3/32 |
| 2017/0291501 | A1* | 10/2017 | Takahashi | B60L 11/1859 |
| 2018/0106017 | A1* | 4/2018 | Huissoon | E02F 3/308 |

FOREIGN PATENT DOCUMENTS

| | | |
|---|---|---|
| JP | 2012-154092 A | 8/2012 |
| JP | 2013-188098 | 9/2013 |
| KR | 10-2009-0024285 | 3/2009 |

OTHER PUBLICATIONS

Japanese-language Written Opinion (PCT/ISA/237) issued in PCT Application No. PCT/JP2015/070012 dated Sep. 8, 2015 (four pages).

Korean-language Office Action issued in corresponding Korean Application No. 10-2017-7001532 dated Feb. 1, 2018 (five (5) pages).

* cited by examiner

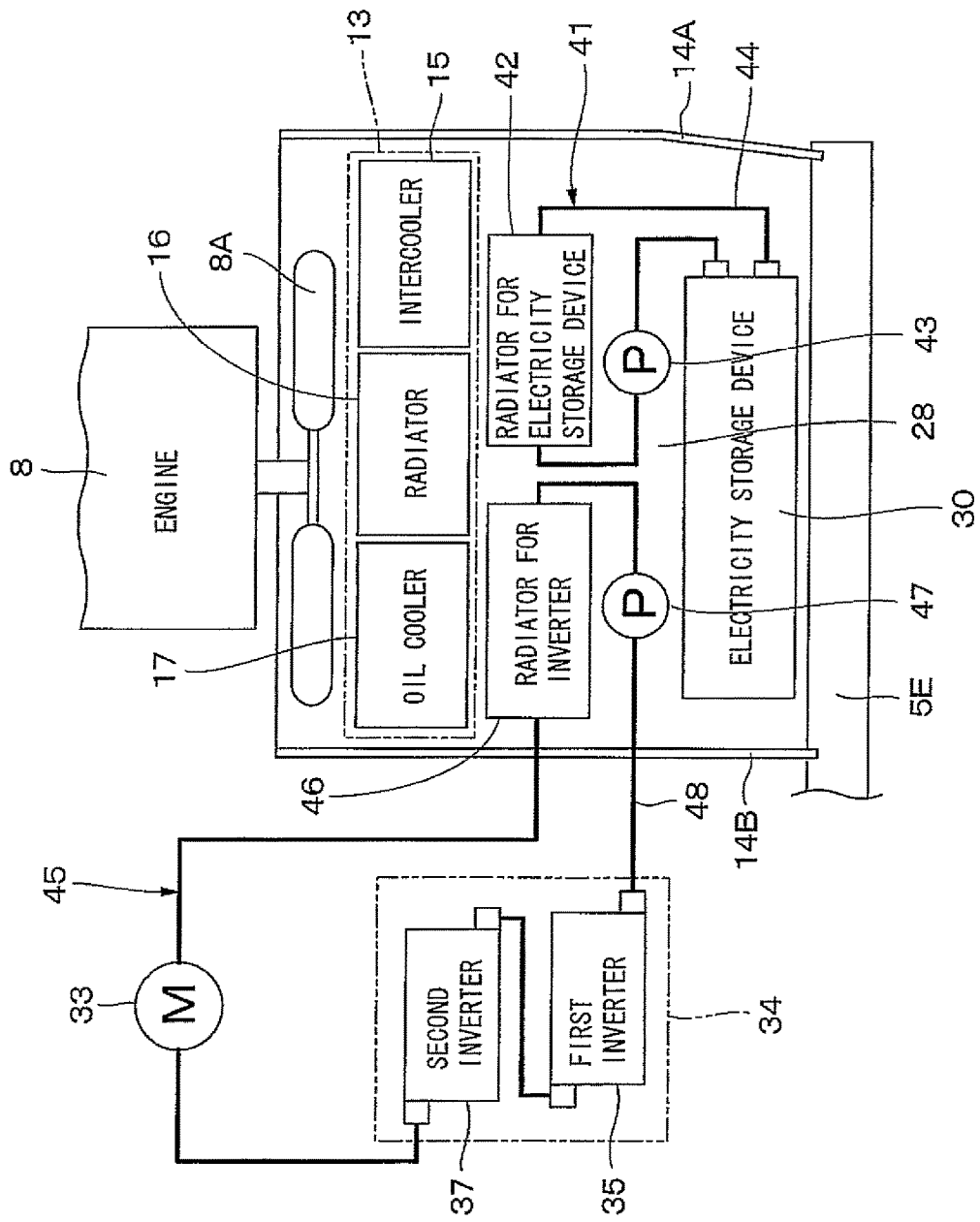

HYBRID-TYPE WORKING MACHINE

TECHNICAL FIELD

The present invention relates to working machines such as hydraulic excavators and wheel-type hydraulic excavators, and particularly to a hybrid-type working machine using both an engine and an electric machinery (electric motor) together as a electric power source.

BACKGROUND ART

In general, a hydraulic excavator as a representative example of a working machine is provided with an engine as a electric power source for traveling and working, wherein a hydraulic pump is driven by this engine. The hydraulic excavator operates hydraulic actuators such as a hydraulic motor and a hydraulic cylinder by pressurized oil supplied from the hydraulic pump to perform an excavating operation of earth and sand or the like.

On the other hand, there is known a hybrid-type working machine using both an engine and an electric motor together, as a working machine such as a hydraulic excavator. This hybrid-type working machine includes an engine, an electric motor that is driven by the engine to generate electric power or assists in a drive of the engine by supply of electric power thereto from an electricity storage device, the electricity storage device that stores electric power to be supplied to the electric motor, and an inverter for controlling an operation of the electric motor.

Here, the electricity storage device or the inverter mounted on the hybrid-type working machine is required to be used under an appropriate temperature condition. Therefore, the hybrid-type working machine is provided with a heat exchanger for cooling the engine, the hydraulic pump and the like, and besides, a cooling circuit including a radiator for cooling the electricity storage device and the inverter (Patent Document 1).

PRIOR ART DOCUMENT

Patent Document

Patent Document 1: Japanese Patent Laid-Open No. 2012-041819 A

SUMMARY OF THE INVENTION

Incidentally, the hybrid-type working machine in the aforementioned conventional art is configured such that the electricity storage device and the inverter are united to be formed as one unit and the electricity storage device and the inverter are together cooled using a cooling circuit of one system equipped with a single radiator.

Therefore, there is a problem that, when a temperature range where the electricity storage device appropriately operates is different from a temperature range where the inverter appropriately operates, it is difficult to cool the electricity storage device and the inverter together using the cooling circuit of one system.

Particularly when a lithium-ion battery to be used as the electricity storage device is subjected to a high temperature state, the battery degrades early, thereby making a working lifetime shorter. Therefore, a cooling temperature of the battery is necessary to be set lower than that of the inverter.

The present invention is made in view of the aforementioned problems in the conventional art, and an object of the present invention is to provide a hybrid-type working machine that can independently cool an electricity storage device aside from another heat generator.

For solving the aforementioned problems, the present invention is applied to a hybrid-type working machine comprising an automotive vehicle body provided with a working mechanism in the front side, a counterweight that is provided in the rear side of the vehicle body to act as a weight balance to the working mechanism, an engine that is arranged in the front side of the counterweight and drives a hydraulic pump, an electric motor that is driven by the engine to generate electric power or assists in a drive of the engine by supply of electric power thereto, a heat exchanger for cooling a fluid including engine cooling water and/or hydraulic oil, a cooling fan for supplying cooling air to the heat exchanger, and an electricity storage device that is arranged in a heat exchanger upstream room upstream of the heat exchanger in a flow direction of the cooling air supplied to the heat exchanger and stores electric power or discharges the electric power.

The present invention is characterized in that the heat exchanger upstream room in the upstream side in the flowing direction of the cooling air supplied to the heat exchanger is provided therein with a radiator for electricity storage device that independently cools the electricity storage device using a coolant, a cooling pump for circulating the coolant, and a cooling line for connection between the cooling pump and the radiator for electricity storage device, wherein the radiator for electricity storage device, the cooling pump and the cooling line configure a cooling system for electricity storage device, which is formed as a closed loop therewith.

According to this configuration, the electricity storage device can be independently cooled aside from the other heat generator using the cooling system for electricity storage device provided with the radiator for electricity storage device. Accordingly the cooling system for electricity storage device can set a cooling temperature optimal for cooling the electricity storage device since it is not necessary to cool the heat generator other than the electricity storage device. As a result, since the electricity storage device can be always kept in an appropriate temperature range, it is possible to operate the electricity storage device smoothly and improve the working lifetime as well. Further, the entire cooling system for electricity storage device can be configured in a compact manner by providing the radiator for electricity storage device, the cooling pump and the cooling line configuring the cooling system for electricity storage device in the heat exchanger upstream room.

BRIEF DESCRIPTION OF THE DRAWINGS

FIG. 6 is a partially enlarged perspective view showing the heat exchanger, the electricity storage device, the radiator for electricity storage device, the radiator for inverter and the like.

FIG. 7 is a partially enlarged perspective view showing the heat exchanger, the radiator for electricity storage device, a cooling pump for electricity storage device, the radiator for inverter, an inverter cooling pump and the like.

FIG. 8 is a partial cutaway enlarged front view showing the heat exchanger, the electricity storage device, the radiator for electricity storage device, the radiator for inverter and the like.

FIG. 10 is a cooling system diagram showing a cooling system for electricity storage device and an inverter cooling system.

MODE FOR CARRYING OUT THE INVENTION

Figure 1:
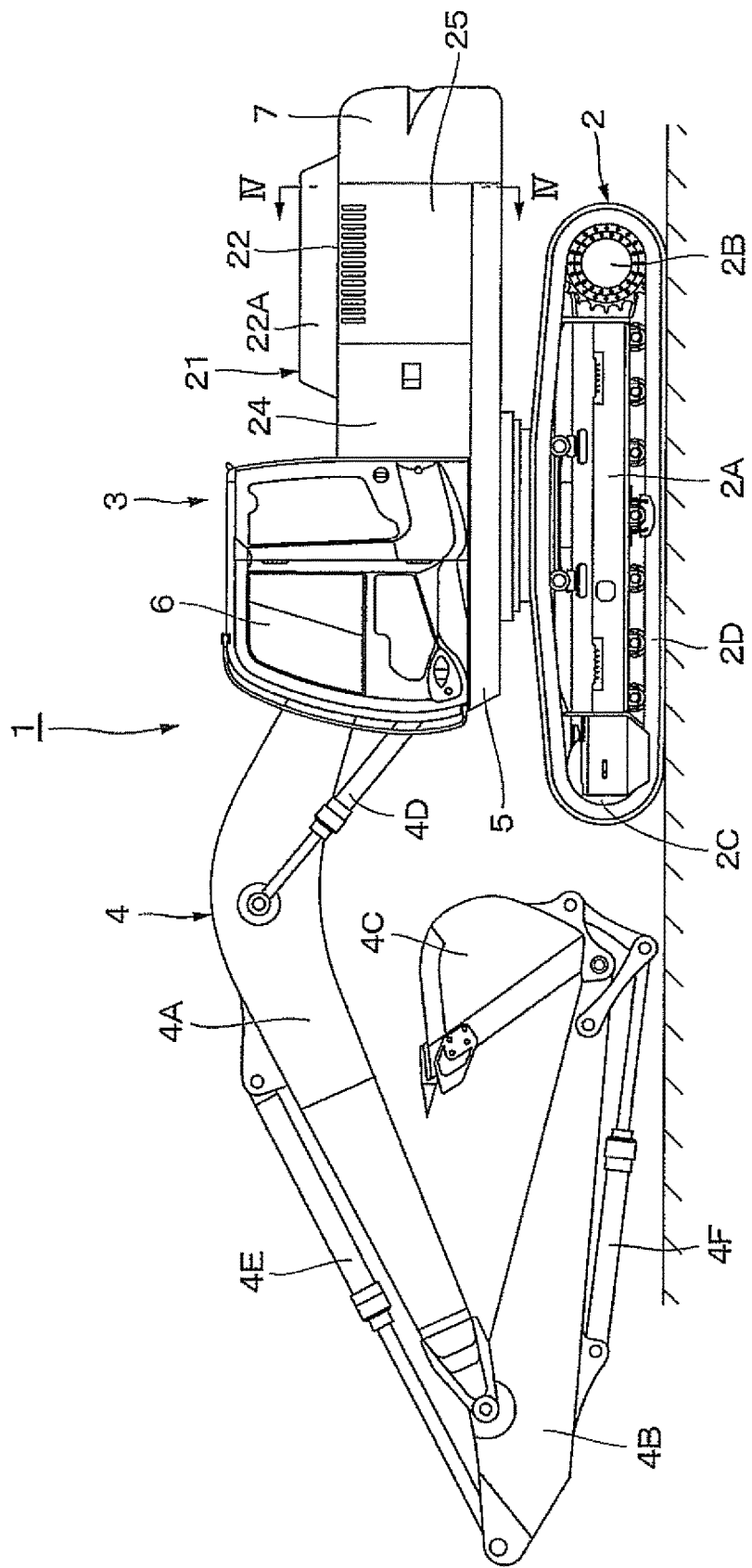
FIG. 1 is a front view showing a hydraulic excavator as a hybrid-type working machine according to a first embodiment of the present invention.

Hereinafter, a hybrid-type working machine according to an embodiment in the present invention will be in detail explained with reference to the accompanying drawings, with an example of application thereof to a hydraulic excavator.

In Figs., a hybrid-type hydraulic excavator 1 is a representative example of hybrid-type working machines. A vehicle body of the hydraulic excavator 1 comprises an automotive lower traveling structure 2 of a crawler type and an upper revolving structure 3 that is mounted on the lower traveling structure 2 to be capable of revolving thereon. A working mechanism 4 is provided in the front side of the upper revolving structure 3 to be capable of lifting and tilting thereto, and an excavating operation of earth and sand and the like can be performed by using the working mechanism 4.

The lower traveling structure 2 comprises a track frame having left and right side frames 2A (the left side only is shown), a drive wheel 2B provided on one side of each of the side frames 2A in the front-rear direction (length direction), an idler wheel 2C provided on the other side thereof in the front-rear direction, and a crawler belt 2D wound between the drive wheel 2B and the idler wheel 2C. The left and right drive wheels 2B are respectively driven by left and right traveling motors 2E, 2F (refer to FIG. 9) to rotate the crawler belts 2D, thus causing the hydraulic excavator 1 to travel.

The working mechanism 4 comprises a boom 4A mounted on a front part side of a revolving frame 5 to be described later to be capable of lifting and tiling thereto, an arm 4B rotatably mounted on a tip end side of the boom 4A, a bucket 4C rotatably mounted on a tip end side of the arm 4B, and a boom cylinder 4D, an arm cylinder 4E and a bucket cylinder 4F, which are respectively composed of hydraulic cylinders for driving them.

The upper revolving structure 3 comprises the revolving frame 5 as a base, a cab 6, a counterweight 7, an engine 8, a hydraulic pump 9, an assist generator motor 12, a heat exchanger 13, an electricity storage device 30, a revolving motor 31, an inverter device 34, a radiator 42 for electricity storage device and a radiator 46 for inverter, which will be described later, mounted on the revolving frame 5, and the like.

Figure 2:
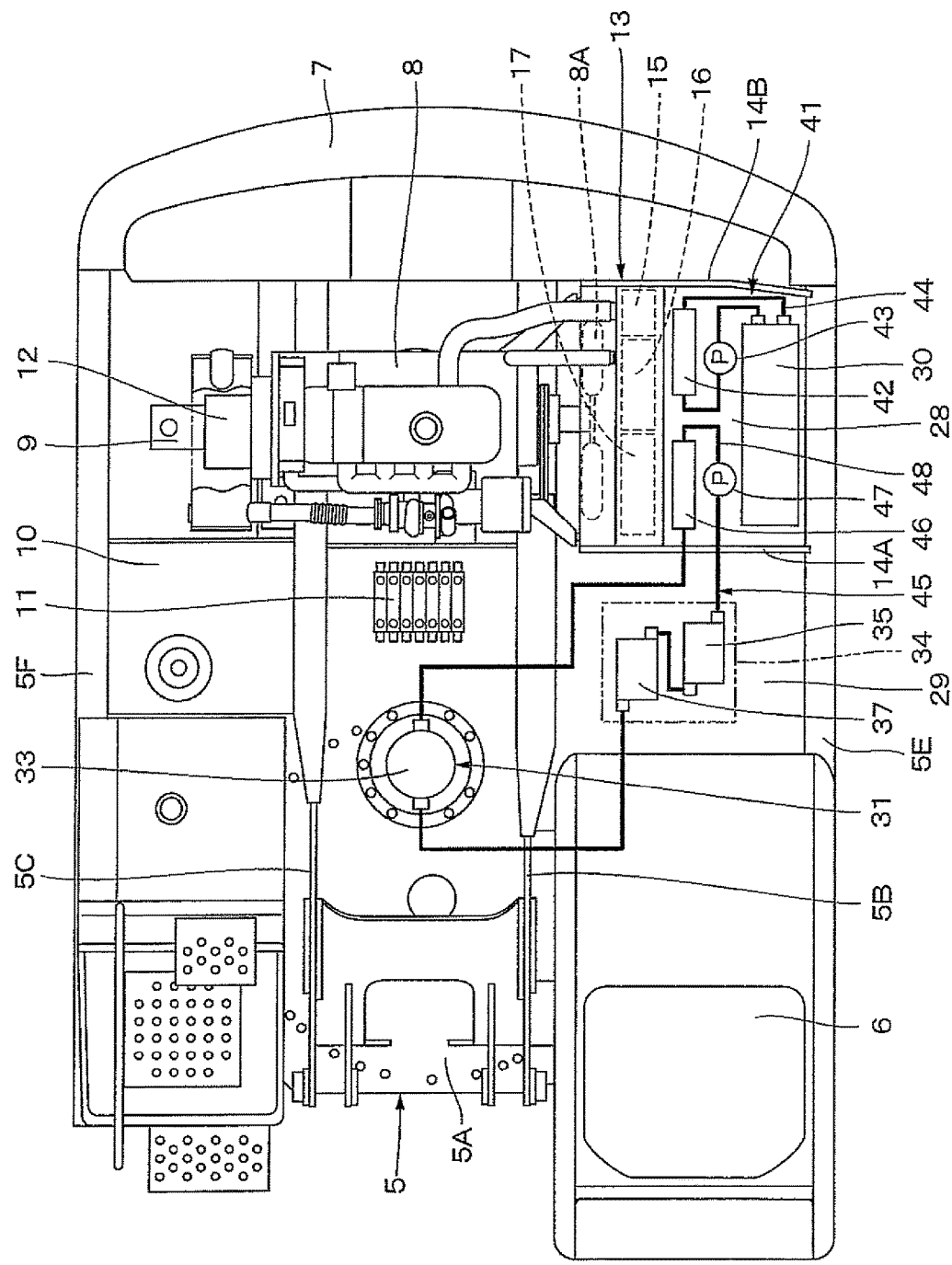
FIG. 2 is a plan view showing an arrangement of an engine, a heat exchanger, an electricity storage device, first and second electric motors, inverters and the like that are mounted on a revolving frame, together with a cooling system.
Figure 3:
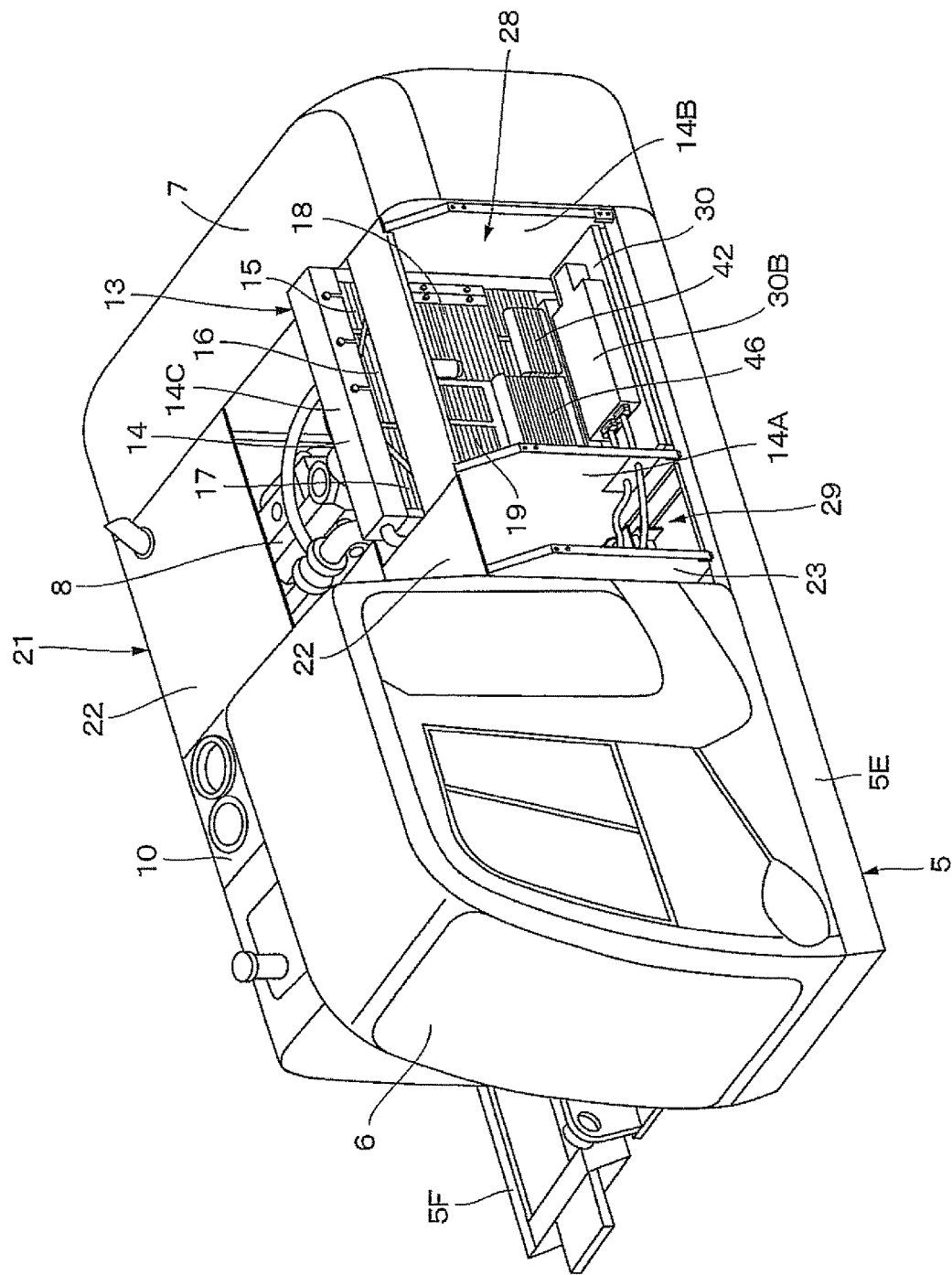
FIG. 3 is a perspective view showing a heat exchanger upstream room, the electricity storage device, a radiator for electricity storage device, a radiator for inverter and the like of an upper revolving structure.

Here, the revolving frame 5, as shown in FIG. 2 and the like, comprises a bottom plate 5A that is formed in a thick flat plate shape and extends in a front-rear direction, a left vertical plate 5B and a right vertical plate 5C that are provided to rise on the bottom plate 5A and face to each other in a left-right direction and extend in the front-rear direction, a plurality of left extension beams 5D provided to extend to the left side from the left vertical plate 5B, a plurality of right extension beams (not shown) provided to extend to the right side from the right vertical plate 5C, a left side frame 5E that is fixed to a tip end side of each of the left extension beams 5D and extends in the front-rear direction, and a right side frame 5F that is fixed to a tip end side of each of the right extension beams and extends in the front-rear direction. A heat exchanger mounting plate 5G on which the heat exchanger 13 to be described later is mounted and an electricity storage device mounting plate 5H on which the electricity storage device 30 to be described later is mounted are mounted in a rear part left side of the revolving frame 5 to be positioned between the left vertical plate 5B and the left side frame 5E (refer to FIG. 6 and FIG. 7).

The cab 6 defining an operator's room is provided on a front part and left side of the revolving frame 5. An operator's seat on which an operator sits is provided in the cab 6, and a traveling operation lever and a working operation lever (both are not shown) are provided in the periphery of the operator's seat. On the other hand, the counterweight 7 is provided in a rear end side of the revolving frame 5 to act as a weight balance to the working mechanism 4.

The engine 8 is positioned in the front side of the counterweight 7 and is disposed on the rear side of the revolving frame 5. The engine 8 is mounted on the revolving frame 5 in a horizontal state where an axis line of a crank shaft (not shown) extends in the left-right direction. The hydraulic pump 9 and the assist generator motor 12, which will be described later, are mounted in the right side of the engine 8. On the other hand, a suction type cooling fan 8A is mounted in the left side of the engine 8 (at the opposite side to the hydraulic pump 9).

Figure 4:
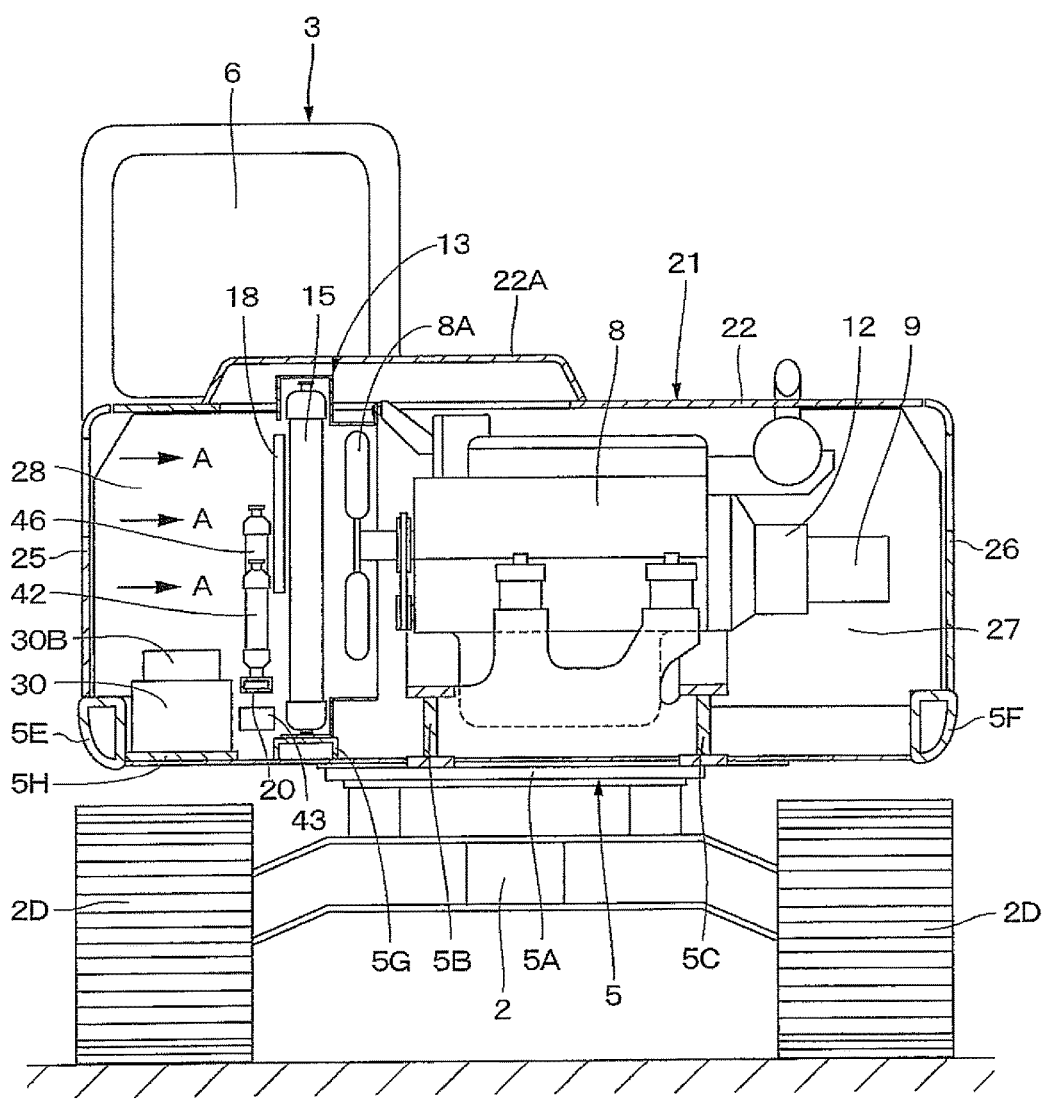
FIG. 4 is a cross sectional view showing flows of cooling air supplied to the heat exchanger, the electricity storage device, the radiator for electricity storage device, the radiator for inverter and the like, as viewed in a direction of arrows IV-IV in FIG. 1.
Figure 5:
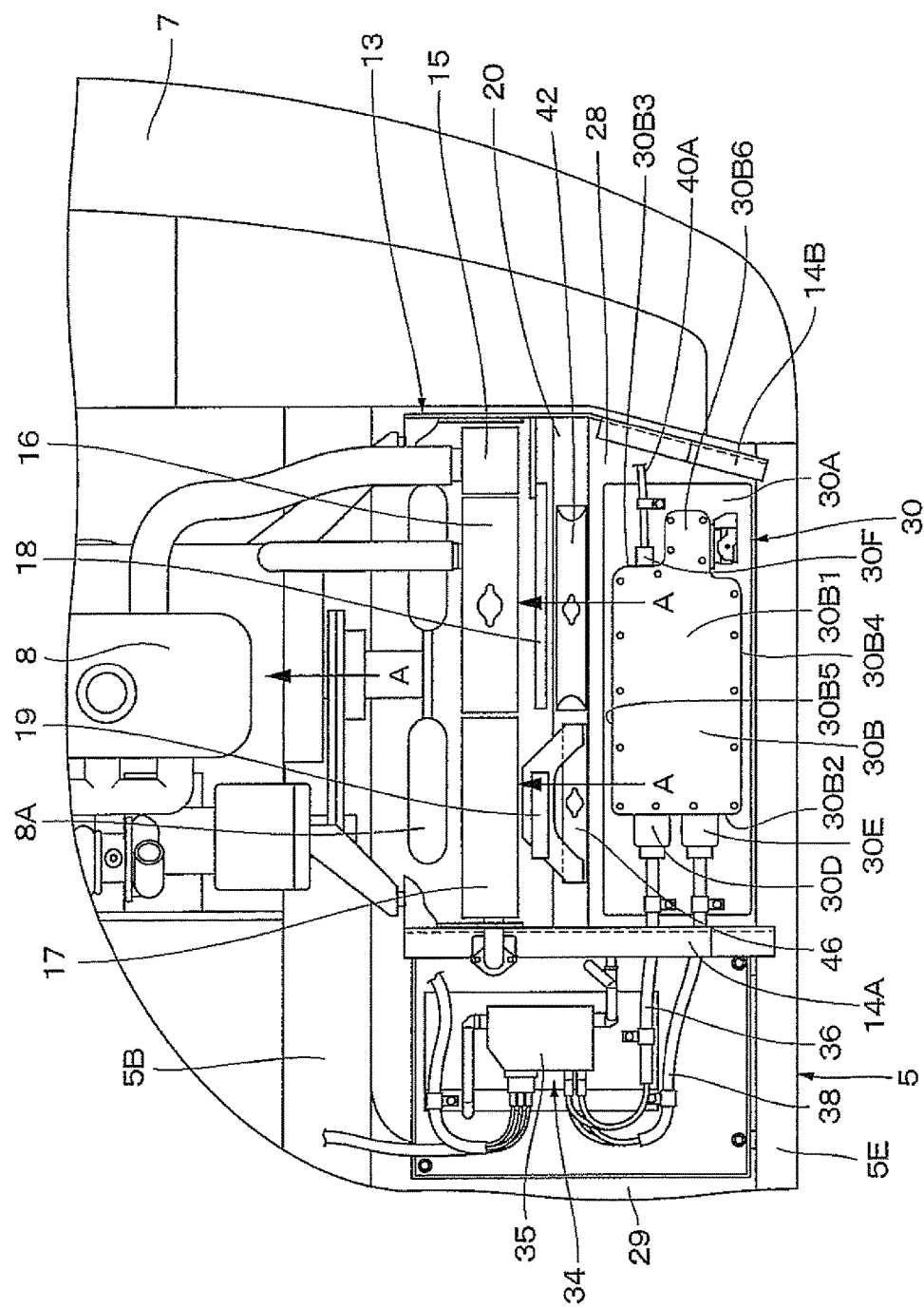
FIG. 5 is an enlarged plan view showing flows of cooling air supplied to the heat exchanger, the electricity storage device, the radiator for electricity storage device, the radiator for inverter and the like, as viewed from above.

The cooling fan 8A is rotated by the engine 8 to suck outside air, and this outside air is supplied to the heat exchanger 13 to be described later and the like, as cooling air. In this case, a flow direction A of the cooling air by the cooling fan 8A conforms to a direction (left-right direction) where the axis line of the crank shaft (not shown) of the engine 8 extends as shown in FIGS. 4 and 5.

The hydraulic pump 9 is mounted in the right side (output side) of the engine 8. The hydraulic pump 9 is driven by the engine 8 to supply pressurized oil to various kinds of hydraulic actuators including the left and right traveling motors 2E, 2F, the respective cylinders 4D, 4E, 4F, a revolving hydraulic motor 32 to be described later and the like, which are mounted on the hydraulic excavator 1. A hydraulic oil tank 10 is provided in the front side of the hydraulic pump 9, and the hydraulic oil tank 10 reserves therein hydraulic oil to be supplied to the hydraulic actuators.

A control valve 11 is provided in the front side of the engine 8. The control valve 11 is composed of an assembly of a plurality of directional control valves. The control valve 11 controls directions of the pressurized oil to be supplied to the various kinds of hydraulic actuators from the hydraulic pump 9 in response to an operation of the operation lever (not shown) disposed in the cab 6.

The assist generator motor (generator electric motor) 12 as a first electric motor is mounted in the right side (output side) of the engine 8 together with the hydraulic pump 9. The assist generator motor 12 is driven by the engine 8 to generate electric power or assists in a drive of the engine 8 by supply of electric power from the electricity storage device 30 to be described later. That is, the assist generator motor 12 has a function of an electric generator that is driven by the engine 8 to generate electric power and a function of an electric motor that assists in a drive of the engine 8 by supply of electric power from the electricity storage device 30 to be described later.

Figure 6:
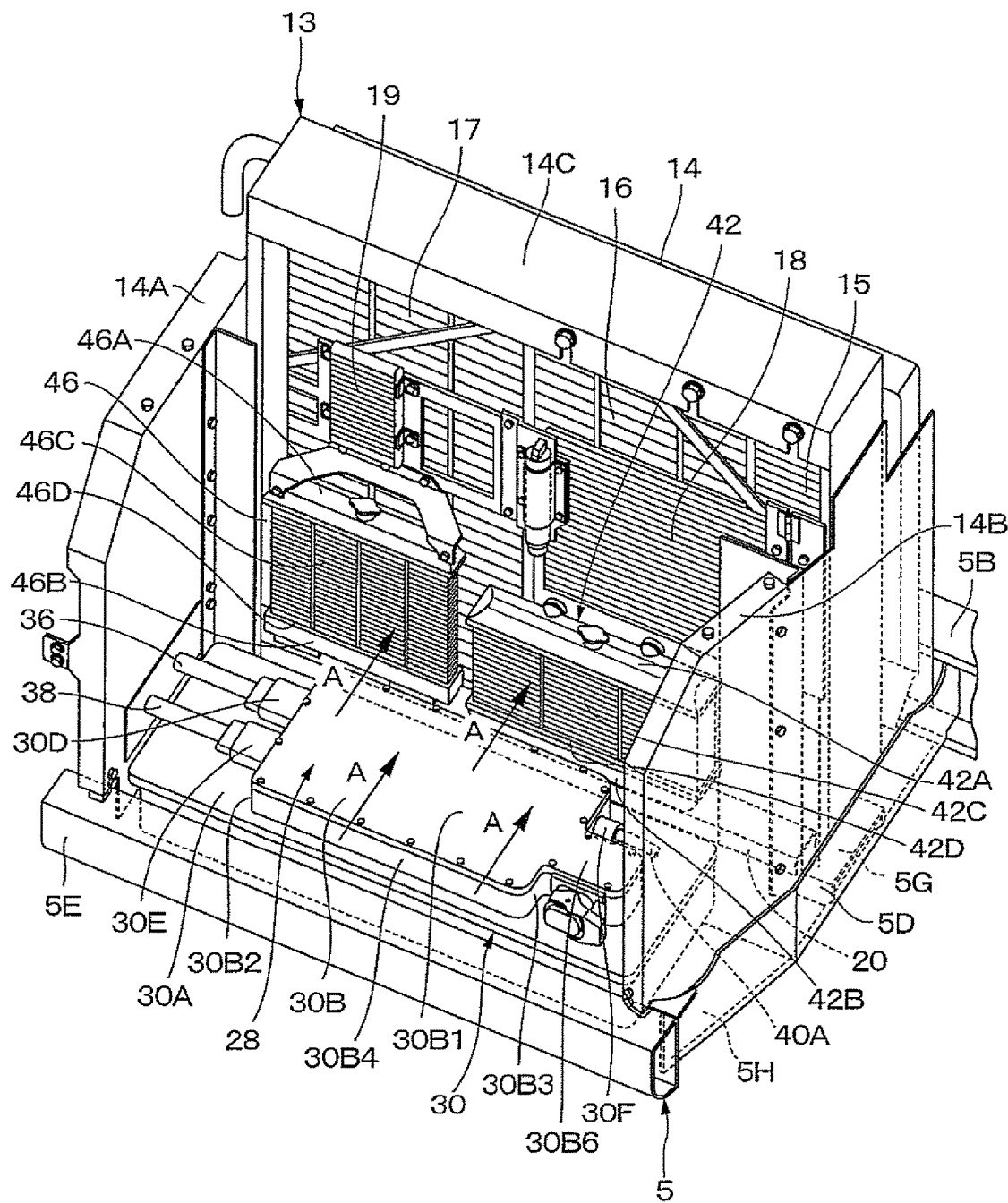
Figure 7:
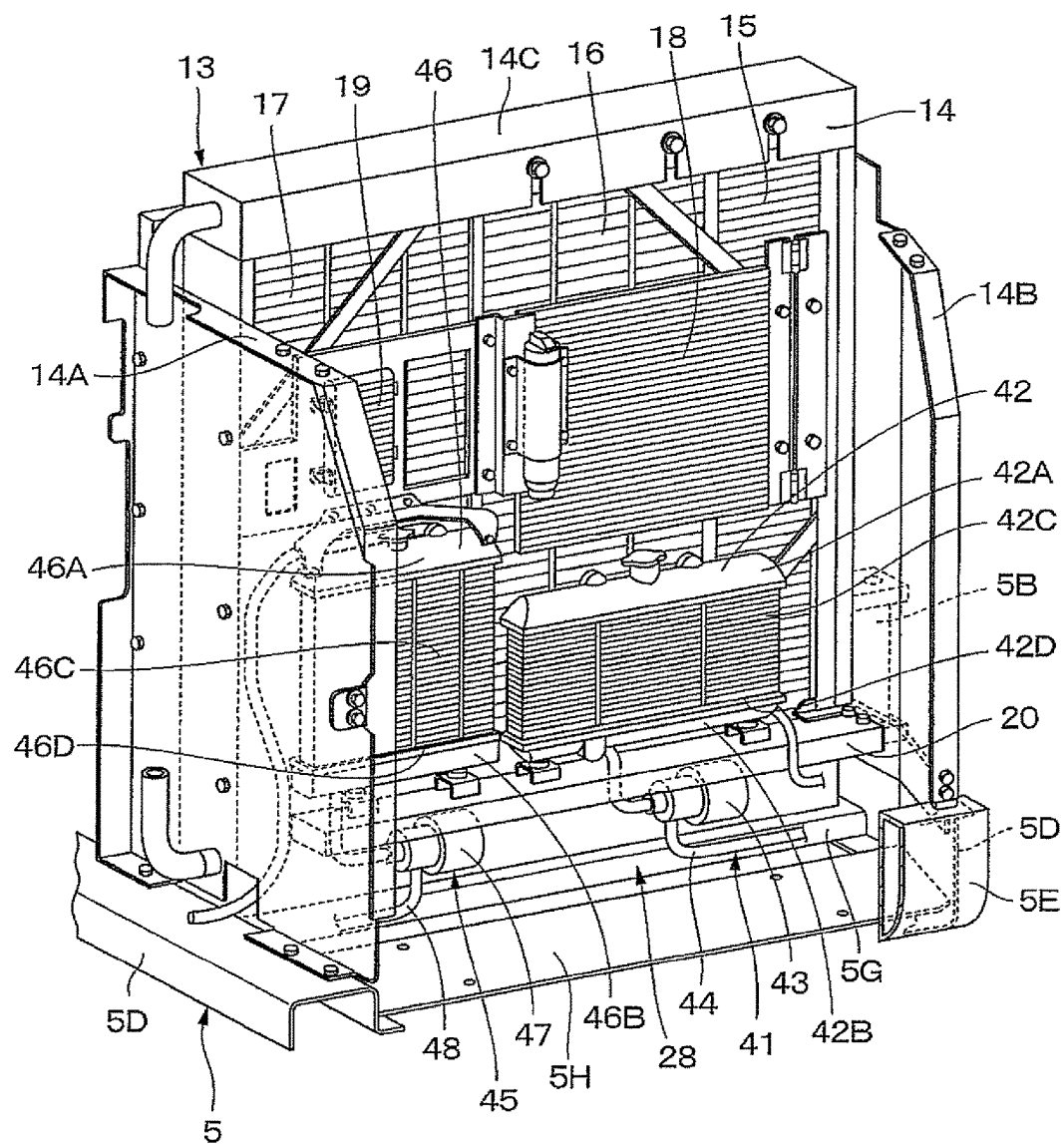
Figure 8:
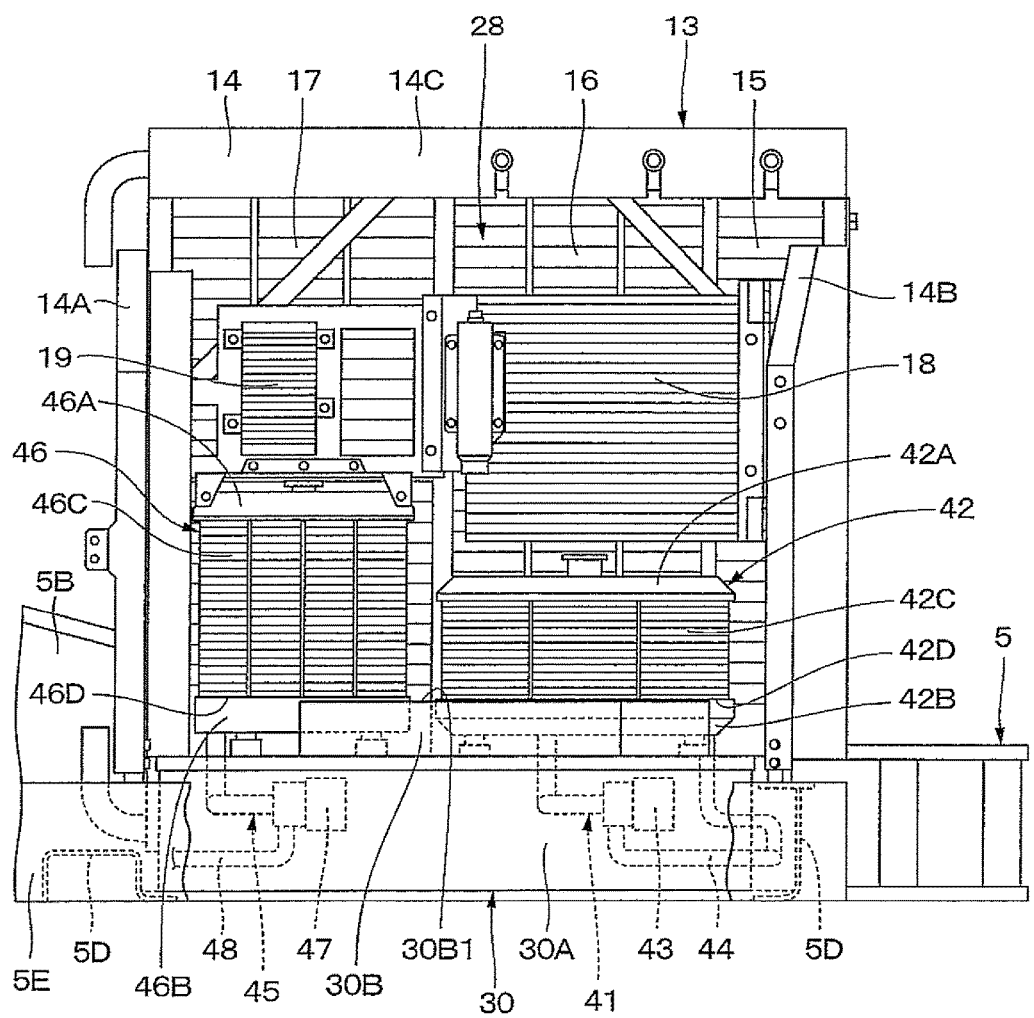

The heat exchanger 13 is positioned in the left side of the engine 8 and is mounted on the revolving frame 5. As shown in FIG. 6 to FIG. 8, the heat exchanger 13 comprises a support frame 14 mounted on the revolving frame 5, an intercooler 15, a radiator 16, an oil cooler 17, a condenser 18 for air conditioner, a fuel cooler 19 and the like assembled in the support frame 14. Thereby, the heat exchanger 13 is configured as a single unit in which the plural members are combined.

Here, the support frame 14 comprises a front partition plate 14A as a front partition member that is disposed in the front side of the heat exchanger 13 (closer to the cab 6), a rear partition plate 14B as a rear partition member that is disposed in the rear side of the heat exchanger 13 along a left front surface part of the counterweight 7, and a connecting member 14C that connects upper parts of the front and rear partition plate 14A, 14B. The front partition plate 14A extends in the left-right direction from the front side of the heat exchanger 13 to the left side frame 5E and extends in the upper-lower direction. The rear partition plate 14B extends in the left-right direction from the rear side of the heat exchanger 13 to the left side frame 5E and extends in the upper-lower direction. The connecting member 14C extends in the front-rear direction and connects the upper parts of the front partition plate 14A and the rear partition plate 14B. Accordingly, the support frame 14 is formed in a long box shape to cover upper parts of the intercooler 15, the radiator 16 and the oil cooler 17. A heat exchanger upstream room 28 to be described later is positioned and formed upstream of the heat exchanger 13 in the flow direction A of the cooling air between the front partition plate 14A and the rear partition plate 14B of the support frame 14.

The intercooler 15 for cooling air compressed by a turbocharger (not shown), the radiator 16 for cooling engine cooling water, the oil cooler 17 for cooling hydraulic oil, the condenser 18 for air conditioner for cooling a coolant for air conditioner and the fuel cooler 19 for cooling fuel are assembled on the support frame 14. The outside air (cooling air) sucked in the heat exchanger upstream room 28 by the cooling fan 8A is supplied to the condenser 18 for air conditioner, the fuel cooler 19, the intercooler 15, the radiator 16 and the oil cooler 17 to cool the compressed air, the engine cooling water, the hydraulic oil, the coolant for air conditioner and the fuel respectively.

In this case, as shown in FIG. 5 and the like, the intercooler 15, the radiator 16 and the oil cooler 17 are arranged in parallel in the flow direction A of the cooling air supplied into the heat exchanger upstream room 28 by the cooling fan 8A. The condenser 18 for air conditioner is arranged upstream of the radiator 16 in the flow direction A of the cooling air, and the fuel cooler 19 is arranged upstream of the oil cooler 17 in the flow direction A of the cooling air.

On the other hand, as shown in FIG. 7, a platform member 20 is fixed between the front partition plate 14A and the rear partition plate 14B configuring the support frame 14 to extend in the front-rear direction through under the condenser 18 for air conditioner and the fuel cooler 19. A radiator 42 for electricity storage device and a radiator 46 for inverter, which will be described later, are mounted on an upper surface side of the platform member 20. A cooling pump 43 for electricity storage device and a cooling pump 47 for inverter, which will be described later, are arranged on a lower surface side of the platform member 20.

A housing cover 21 is positioned in the front side of the counterweight 7 and is provided on the revolving frame 5. The housing cover 21 covers the engine 8, the hydraulic pump 9, the assist generator motor 12, the heat exchanger 13 and the like. Here, an upper side of the housing cover 21 comprises an upper surface plate 22 and an engine cover 22A. A left side of the housing cover 21 comprises a left front side door 24 and a left rear side door 25 to be described later. A right side of the housing cover 21 comprises a right side door 26 (refer to FIG. 4).

A front partition cover 23 is provided between a rear side position of the cab 6 and the front partition plate 14A of the support frame 14 configuring the heat exchanger 13. The front partition cover 23 faces the front partition plate 14A of the support frame 14 to be spaced therefrom in the front-rear direction and partitions the front side of a utility room 29 to be described later.

The left front side door 24 is mounted on the front partition cover 23 to be able to open/close. The left front side door 24 is rotatably supported to the front partition cover 23 through a hinge member. The left front side door 24 rotates in the front-rear direction about a position of the front partition cover 23 to open/close the utility room 29 to be described later.

The left rear side door 25 is mounted in the rear side of the left front side door 24. The left rear side door 25 is rotatably supported to the rear partition plate 14B of the support frame 14 of the heat exchanger 13 through a hinge member. The left rear side door 25 rotates in the front-rear direction about a position of the rear partition plate 14B to open/close the heat exchanger upstream room 28 to be described later.

An engine room 27 is formed in the housing cover 21 (refer to FIG. 4). The engine room 27 is defined by the upper surface plate 22, the engine cover 22A, the right side door 26, the heat exchanger 13, the counterweight 7 and the hydraulic oil tank 10 configuring the housing cover 21. The engine 8, the hydraulic pump 9, the assist generator motor 12 and the like are accommodated in the engine room 27.

The heat exchanger upstream room 28 is formed at the opposite side to the engine room 27 at the center of the heat exchanger 13 in the housing cover 21. The heat exchanger upstream room 28 comprises a space formed upstream of the heat exchanger 13 in the flow direction A of the cooling air between the front partition plate 14A and the rear partition plate 14B of the support frame 14. The heat exchanger upstream room 28 is covered at the upper side with the upper surface plate 22 of the housing cover 21 and opens/closes by the left rear side door 25. Further, the electricity storage device 30, the radiator 42 for electricity storage device and the radiator 46 for inverter, which will be described later, and the like are arranged inside the heat exchanger upstream room 28.

The utility room 29 is formed in the front side of the heat exchanger upstream room 28 in the housing cover 21. The utility room 29 is defined by the upper surface plate 22 and the left front side door 24 configuring the housing cover 21, the front partition cover 23 and the front partition plate 14A. The inverter device 34 to be described later is arranged in the utility room 29.

The electricity storage device 30 is disposed upstream of the heat exchanger 13 in the flow direction A of the cooling air supplied to the heat exchanger 13, that is, in a position close to the left rear side door 25. The electricity storage device 30 comprises a lithium ion battery, for example, and is mounted on the electricity storage device mounting plate 5H of the revolving frame 5. The electricity storage device 30 charges (stores) electric power generated by the assist generator motor 12 and regenerative electric power generated by the revolving electric motor 33 to be described later by deceleration of a revolving operation (regenerative operation) of the upper revolving structure 3. On the other hand, the electricity storage device 30 discharges (supplies) the stored electric power to the assist generator motor 12 and the revolving electric motor 33. It should be noted that the electricity storage device 30 may use, for example, a capacitor of an electrical double layer other than the battery.

Here, as shown in FIG. 5 and FIG. 6, the electricity storage device 30 comprises a rectangular casing 30A in which a plurality of battery modules are accommodated and a connecting box (junction box) 30B that is composed of a box smaller than the casing 30A and is mounted on the casing 30A. A water jacket (not shown) in which cooling water circulates is formed in the casing 30A.

Figure 9:
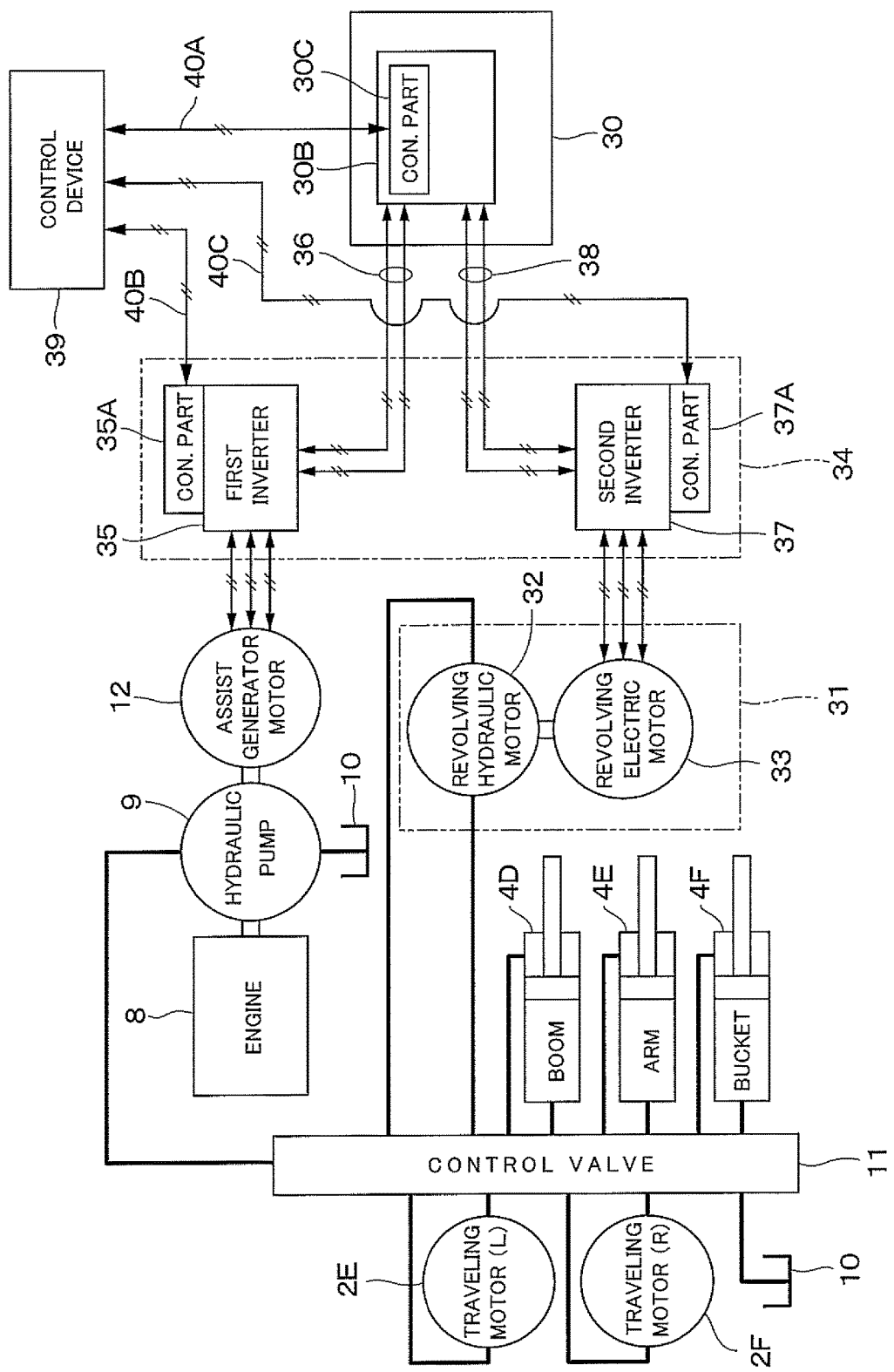
FIG. 9 is a block diagram schematically showing a hydraulic system and an electrical system of the hydraulic excavator.

The connecting box 30B establishes connection between cables 36, 38 extending from the first and second inverters 35, 37 to be described later and a terminal of the electricity storage device 30. As shown in FIG. 9, an electrical circuit (not shown) of a control part 30C and the like are accommodated in the connecting box 30B. The electrical circuit controls charge/discharge of the electricity storage device 30 based upon supply of signals from a control device 39 to be described later.

Here, the connecting box 30B is surrounded by an upper surface 30B1, a front side surface 30B2, a rear side surface 30B3, a left side surface 30B4 and a right side surface 30B5. An extension portion 30B6 extending backward is provided in an intermediate part of the rear side surface 30B3 in the left-right direction. A first cable connecting port 30D and a second cable connecting port 30E are provided on the front side surface 30B2 of the connecting box 30B to line up in the left-right direction. The cable 36 to be described later for connection to the first inverter 35 is connected to the first cable connecting port 30D, and the cable 38 to be described later for connection to the second inverter 37 is connected to the second cable connecting port 30E. On the other hand, a signal line connecting port 30F is provided on the rear side surface 30B3 of the connecting box 30B. A signal line 40A to be described later is connected to the signal line connecting port 30F for connection between the control part 30C in the electricity storage device 30 and the control device 39.

In this case, the upper surface 30B1 of the connecting box 30B corresponds to an upper end position of the electricity storage device 30. The first and second cable connecting ports 30D, 30E provided on the front side surface 30B2 of the connecting box 30B and the signal line connecting port 30F provided on the rear side surface 30B3 of the connecting box 30B are arranged in a position lower than the upper surface 30B1 of the connecting box 30B. Therefore, it is possible to prevent the first and second cable connecting ports 30D, 30E and the cables 36, 38 connected thereto, the signal line connecting port 30F and the signal line 40A connected thereto from protruding upward from the upper surface 30B1 of the connecting box 30B.

The revolving motor 31 is provided in the central part of the revolving frame 5. The revolving motor 31 revolves the upper revolving structure 3 to the lower traveling structure 2. As shown in FIG. 9, the revolving motor 31 comprises a revolving hydraulic motor 32 driven by the pressurized oil supplied from the hydraulic pump 9 and a revolving electric motor 33, which will be described later, mounted on the revolving hydraulic motor 32.

The revolving electric motor 33 configures a second electric motor. The revolving electric motor 33 revolves the upper revolving structure 3 on the lower traveling structure 2 in cooperation with the revolving hydraulic motor 32. The water jacket in which cooling water circulates is formed in a casing as an outer shell of the revolving electric motor 33 (any thereof is not shown). Here, the revolving electric motor 33 is driven by supply of electric power stored in the electricity storage device 30 to revolve the upper revolving structure 3. Further, the revolving electric motor 33 generates regenerative electric power by a regenerative operation when decelerating a revolving operation of the upper revolving structure 3, and supplies the regenerative electric power to the electricity storage device 30.

That is, the revolving electric motor 33 has a function of an electric motor that revolves the upper revolving structure 3 by supply of electric power from the electricity storage device 30 via the cable 38 to be described later. On the other hand, the revolving electric motor 33 has a function of an electric generator that converts kinetic energy of the upper revolving structure 3 into electrical energy at the time of decelerating a revolving operation of the upper revolving structure 3. The regenerative electric power generated by the revolving electric motor 33 is supplied to the electricity storage device 30 via the cable 38 to be stored in the electricity storage device 30.

Next, an explanation will be made of an electric system of the hybrid-type hydraulic excavator 1.

As shown in FIG. 9, the electric system of the hydraulic excavator 1 comprises the assist generator motor 12, the electricity storage device 30 and the revolving electric motor 33 as mentioned above, and the inverter device 34, the control device 39 and the like which will be described later.

The inverter device 34 is provided in the utility room 29. The inverter device 34 is arranged closer to the front side than the electricity storage device 30 provided in the heat exchanger upstream room 28 (refer to FIG. 2). The inverter device 34 is configured as one unit equipped with the first inverter 35 and the second inverter 37 which will be described later.

The first inverter 35 is positioned closer to the front side than the electricity storage device 30 and is arranged in the utility room 29. The first inverter 35 controls an operation of the assist generator motor 12. The first inverter 35 comprises a plurality of switching elements composed of a transistor, an insulating gate bipolar transistor (IGBT) and the like accommodated in a casing as an outer shell, and an on/off operation of each of the switching elements is controlled by a control part 35A. A water jacket (not shown) in which cooling water circulates is formed in the casing of the first inverter 35.

Here, the first inverter 35 and the electricity storage device 30 are connected at a plus side and at a minus side to each other through a pair of cables (DC bus) 36. At the time of electric power generating of the assist generator motor 12, the first inverter 35 converts the electric power generated by the assist generator motor 12 into DC electric power, and supplies the DC electric power to the electricity storage device 30 through the cable 36. On the other hand, at the time of driving the assist generator motor 12 as an electric motor, the first inverter 35 converts DC electric power supplied from the electricity storage device 30 through the cable 36 into three-phase AC electric power, and supplies the AC electric power to the assist generator motor 12.

The second inverter 37 is arranged in the utility room 29 together with the first inverter 35 in a state of overlapping the first inverter 35 up and down. The second inverter 37 controls an operation of the revolving electric motor 33. The second inverter 37, as similar to the first inverter 35, comprises a plurality of switching elements accommodated in a casing as an outer shell, and an on/off operation of each of the switching elements is controlled by a control part 37A. A water jacket (not shown) in which cooling water circulates is formed in the casing of the second inverter 37.

Here, the second inverter 37 and the electricity storage device 30 are connected at a plus side and at a minus side to each other through a pair of cables (DC bus) 38. When the revolving electric motor 33 revolves and rotates the upper revolving structure 3, the second inverter 37 converts DC electric power supplied through the cable 38 into three-phase AC electric power, and supplies the AC electric power to the revolving electric motor 33. On the other hand, when the revolving electric motor 33 generates regenerative electric power by a regenerative operation at the time of decelerating a revolving operation of the upper revolving structure 3, the second inverter 37 converts the regenerative electric power by the revolving electric motor 33 into DC electric power, and supplies the DC electric power to the electricity storage device 30 through the cable 38.

The control device 39 controls operations of the electricity storage device 30, the assist generator motor 12, the revolving electric motor 33 and the like. The control device 39 is connected to the control part 30C of the electricity storage device 30 through the signal line 40A, and is connected to the control part 35A of the first inverter 35 through a signal line 40B. The control device 39 is connected to the control part 37A of the second inverter 37 through a signal line 40C. The control device 39 outputs a control signal to the control part 30C of the electricity storage device 30 to control the charge or discharge by the electricity storage device 30. In addition, the control device 39 outputs control signals to the control parts 35A, 37A of the first and second inverters 35, 37 to control operations of the assist generator motor 12 and the revolving electric motor 33, respectively.

Next, an explanation will be made of a cooling system for cooling the electricity storage device 30, the inverter device 34 and the like mounted on the hydraulic excavator 1.

A cooling system 41 for electricity storage device cools the electricity storage device 30 independently aside from the inverter device 34. The cooling system 41 for electricity storage device comprises a radiator 42 for electricity storage device for cooling the electricity storage device 30 using cooling water as a coolant, a cooling pump 43 for electricity storage device for circulating cooling water, and a cooling line 44 for electricity storage device for connection between the radiator 42 for electricity storage device and the cooling pump 43 for electricity storage device. The cooling system 41 for electricity storage device forms a closed loop connected to the water jacket of the electricity storage device 30 (refer to FIG. 10). The radiator 42 for electricity storage device, the cooling pump 43 for electricity storage device and the cooling line 44 for electricity storage device configuring the cooling system 41 for electricity storage device are provided in the heat exchanger upstream room 28 positioned upstream of the heat exchanger 13 in the flow direction A of the cooling air.

Here, as shown in FIG. 6 to FIG. 8, the radiator 42 for electricity storage device is mounted on the platform member 20 provided in the support frame 14 of the heat exchanger 13. Accordingly, the radiator 42 for electricity storage device is positioned in a lower side than the condenser 18 for air conditioner configuring the heat exchanger 13 and is disposed between the heat exchanger 13 and the electricity storage device 30. The radiator 42 for electricity storage device cools cooling water flowing in a water jacket provided in the casing 30A of the electricity storage device 30 to cool the electricity storage device 30.

The radiator 42 for electricity storage device is formed in a box shape extending in the front-rear direction on the platform member 20, and comprises an upper tank 42A into which the cooling water heated by the electricity storage device 30 flows, a lower tank 42B into which the cooling water cooled flows, a heat radiation part (core) 42C provided between the upper tank 42A and the lower tank 42B, and the like.

The heat radiation part 42C comprises a plurality of narrow tubes having an upper end side that opens to the upper tank 42A and a lower end side that opens to the lower tank 42B, and heat radiation fins connected to the respective narrow tubes. The heat radiation part 42C releases heat of the cooling water through the heat radiation fins subjected to the cooling air for a period in which the cooling water having flowed into the upper tank 42A flows into the lower tank 42B through the respective narrow tubes.

Accordingly, the cooling water heated by the electricity storage device 30 is circulated by the cooling pump 43 for electricity storage device, and flows into the upper tank 42A of the radiator 42 for electricity storage device. Thereafter, the cooling water is cooled by the cooling air supplied into the heat exchanger upstream room 28 by the cooling fan 8A while passing the heat radiation part 42C. The cooling water the heat of which is radiated by the heat radiation part 42C is supplied to the water jacket of the electricity storage device 30 from the lower tank 42B of the radiator 42 for electricity storage device through the cooling line 44 for electricity storage device to cool the electricity storage device 30.

In this case, a lower end part 42D of the heat radiation part 42C in the radiator 42 for electricity storage device is arranged on the substantially same plane with the upper surface 30B1 of the connecting box 30B as an upper end part of the electricity storage device 30. That is, the lower end part 42D of the heat radiation part 42C is arranged in a height position equal to or higher than a height of the upper surface 30B1 of the connecting box 30B. Therefore, when the cooling air flows into the heat exchanger upstream room 28 by the cooling fan 8A of the engine 8, it is possible to prevent the upper side part of the connecting box 30B from overlapping the heat radiation part 42C in the flow direction A of the cooling air, and to supply the cooling air equally over an entire surface of the heat radiation part 42C.

A cooling system 45 for inverter cools the first and second inverters 35, 37 configuring the inverter device 34 and the revolving electric motor 33 aside from the electricity storage device 30. The cooling system 45 for inverter comprises the radiator 46 for inverter for cooling the first and second inverters 35, 37 and the revolving electric motor 33 by using cooling water as a coolant, the cooling pump 47 for inverter as another cooling pump for circulating cooling water, and a cooling line 48 for inverter as another cooling line for mutually connecting the radiator 46 for inverter, the first and second inverters 35, 37 and the revolving electric motor 33. The cooling system 45 for inverter forms a closed loop connected to the water jackets of the first and second inverters 35, 37 and the revolving electric motor 33 (refer to FIG. 10). The radiator 46 for inverter configuring the cooling system 45 for inverter is provided neighbored to the radiator 42 for electricity storage device in the heat exchanger upstream room 28 positioned upstream of the heat exchanger 13 in the flow direction of the cooling air.

Here, the radiator 46 for inverter is mounted on the platform member 20 provided in the support frame 14 of the heat exchanger 13 to be neighbored to the front side (to the front partition plate 14A-side) of the radiator 42 for electricity storage device. Accordingly, the radiator 46 for inverter is positioned in a lower side than the fuel cooler 19 configuring the heat exchanger 13 and is disposed between the heat exchanger 13 and the electricity storage device 30. The radiator 46 for inverter cools cooling water flowing in the water jackets of the first and second inverters 35, 37 and in the water jacket of the revolving electric motor 33 to cool the first and second inverters 35, 37 and the revolving electric motor 33.

The radiator 46 for inverter is formed in a box shape extending in the front-rear direction on the platform member 20, and comprises an upper tank 46A into which the cooling water heated by the first and second inverters 35, 37 and the revolving electric motor 33 flows, a lower tank 46B into which the cooling water cooled flows, a heat radiation part (core) 46C provided between the upper tank 46A and the lower tank 46B, and the like.

The heat radiation part 46C comprises a plurality of narrow tubes having an upper end side that opens to the upper tank 46A and a lower end side that opens to the lower tank 46B, and heat radiation fins connected to the respective narrow tubes. The heat radiation part 46C releases heat of the cooling water through the heat radiation fins subjected to the cooling air for a period in which the cooling water having flowed into the upper tank 46A flows into the lower tank 46B through the respective narrow tubes.

Accordingly, the cooling water heated by the first and second inverters 35, 37 and the revolving electric motor 33 is circulated by the cooling pump 47 for inverter and flows into the upper tank 46A of the radiator 46 for inverter. Thereafter, the cooling water is cooled by the cooling air supplied into the heat exchanger upstream room 28 by the cooling fan 8A while passing the heat radiation part 46C. The cooling water the heat of which is released by the heat radiation part 46C is supplied to the water jackets of the first and second inverters 35, 37 and the revolving electric motor 33 from the lower tank 46B of the radiator 46 for inverter through the cooling line 48 for inverter to cool the first and second inverters 35, 37 and the revolving electric motor 33.

In this case, a lower end part 46D of the heat radiation part 46C in the radiator 46 for inverter is arranged on the substantially same plane with the upper surface 30B1 of the connecting box 30B as the upper end part of the electricity storage device 30. That is, the lower end part 46D of the heat radiation part 46C is arranged in a height position equal to or higher than a height of the upper surface 30B1 of the connecting box 30B. Therefore, when the cooling air flows into the heat exchanger upstream room 28, it is possible to prevent the upper side part of the connecting box 30B from overlapping the heat radiation part 46C in the flow direction A of the cooling air, and to supply the cooling air equally over an entire surface of the heat radiation part 46C.

In this way, the electricity storage device 30 and the first and second inverters 35, 37 can be individually cooled by providing the radiator 42 for electricity storage device and the radiator 46 for inverter separately. As a result, it is possible to keep the electricity storage device 30 to be in an appropriate temperature range by the radiator 42 for electricity storage device and keep the first and second inverters 35, 37 to be in an appropriate temperature range by the radiator 46 for inverter.

In addition, the electricity storage device 30 is independently cooled by using the cooling system 41 for electricity storage device equipped with the radiator 42 for electricity storage device aside from the heat exchanger 13. Therefore, it is not necessary for the cooling system 41 for electricity storage device to cool a heat generating element other than the electricity storage device 30. Accordingly, the cooling system 41 for electricity storage device can set a cooling temperature optimal for cooling the electricity storage device 30.

In addition, as shown in FIG. 5, the radiator 42 for electricity storage device and the radiator 46 for inverter are arranged upstream of the heat exchanger 13 in the flow direction A of the cooling air flowing into the heat exchanger upstream room 28 and in parallel in the flow direction A of the cooling air. As a result, the cooling air before passing the heat exchanger 13 to be warmed can be supplied equally to the radiator 42 for electricity storage device and the radiator 46 for inverter.

Further, as shown in FIG. 10, the inverter device 34 is positioned closer to the front side than the electricity storage device 30 arranged in the heat exchanger upstream room 28 and is arranged in the utility room 29. On the other hand, the radiator 46 for inverter is arranged in the front side close to the inverter device 34 (to the front partition plate 14A-side) in the heat exchanger upstream room 28, and the radiator 42 for electricity storage device is arranged in the rear side of the radiator 46 for inverter (to the rear partition plate 14B-side) in the heat exchanger upstream room 28.

Therefore, an arrangement relation in the front-rear direction between the inverter device 34 and the electricity storage device 30 can be set to conform with an arrangement relation in the front-rear direction between the radiator 46 for inverter and the radiator 42 for electricity storage device. As a result, the cooling line 44 for electricity storage device in the cooling system 41 for electricity storage device and the cooling line 48 for inverter in the cooling system 45 for inverter can be arranged in order without overlapping to each other.

The hybrid-type hydraulic excavator 1 according to the present embodiment has the configuration as described above, and next, an explanation will be made of an operation thereof.

When an operator who has got on the cab 6 operates the engine 8, the hydraulic pump 9 and the assist generator motor 12 are driven by the engine 8. As a result, the pressurized oil delivered from the hydraulic pump 9 is supplied to the left and right traveling motors 2E, 2F, the revolving hydraulic motor 32, and the boom cylinder 4D, the arm cylinder 4E and the bucket cylinder 4F in the working mechanism 4 in response to operations of an operation lever (not shown) provided in the cab 6. Thereby, the hydraulic excavator 1 performs a traveling operation by the lower traveling structure 2, a revolving operation by the upper revolving structure 3, an excavating operation by the working mechanism 4 and the like.

At the operating of the hydraulic excavator 1, when the cooling fan 8A is driven by the engine 8, outside air is sucked into the heat exchanger upstream room 28. The outside air sucked into the heat exchanger upstream room 28 is supplied to the electricity storage device 30, the radiator 42 for electricity storage device, the radiator 46 for inverter, the heat exchanger 13 and the like as cooling air, and thereafter, is discharged to the outside through the engine room 27.

Here, when output torque of the engine 8 is greater than drive torque of the hydraulic pump 9 at the operating of the hydraulic excavator 1, the assist generator motor 12 is driven as an electric generator by the extra toque. Therefore, the assist generator motor 12 generates AC electric power. The AC electric power is converted into DC electric power by the first inverter 35, which is then stored in the electricity storage device 30. On the other hand, when the output torque of the engine 8 is smaller than the drive torque of the hydraulic pump 9, the assist generator motor 12 is driven as an electric motor by the electric power from the electricity storage device 30 to assist in a drive of the hydraulic pump 9 by the engine 8.

The revolving electric motor 33 is driven by supply of the electric power stored in the electricity storage device 30 to revolve the upper revolving structure 3 on the lower traveling structure 2 in cooperation with the revolving hydraulic motor 32. The revolving electric motor 33 generates AC electric power (regenerative electric power) by a regenerative operation when the upper revolving structure 3 decelerates. The AC electric power is converted into DC electric power by the second inverter 37, which is then stored in the electricity storage device 30.

In this way, since the assist generator motor 12, the revolving electric motor 33 and the like are driven at the operating of the hydraulic excavator 1, the first inverter 35 for controlling the assist generator motor 12 and the second inverter 37 for controlling the revolving electric motor 33 generate heat to increase temperatures thereof. The electricity storage device 30 performs charge and discharge thereof according to operating situations of the hydraulic excavator 1 to generate heat and increase temperatures thereof.

On the other hand, the present embodiment is provided with the cooling system 41 for electricity storage device for cooling the heated electricity storage device 30 and the cooling system 45 for inverter for cooling the first and second inverters 35, 37 (inverter device 34) aside from the electricity storage device 30, and an explanation will be hereinafter made of an operation thereof.

First, an explanation will be made of an operation of the cooling system 41 for electricity storage device. As shown in FIG. 10, the cooling system 41 for electricity storage device forms a closed loop connected to the water jacket of the electricity storage device 30 by the radiator 42 for electricity storage device, the cooling pump 43 for electricity storage device and the cooling line 44 for electricity storage device. Therefore, when the cooling pump 43 for electricity storage device operates, the cooling water (coolant) in the water jacket of the electricity storage device 30 flows into the upper tank 42A of the radiator 42 for electricity storage device. The cooling water having flowed into the upper tank 42A passes the heat radiation part 42C, and then flows into the lower tank 42B.

Then, when the cooling fan 8A is driven by the engine 8, outside air (cooling air) is supplied into the heat exchanger upstream room 28. When this cooling air passes the heat radiation part 42C of the radiator 42 for electricity storage device, the heat of the cooling water is released. Therefore, the cooling water the heat of which is released flows into the lower tank 42B of the radiator 42 for electricity storage device, and the cooling water the heat of which is released is then supplied to the water jacket of the electricity storage device 30 (casing 30A) from the lower tank 42B through the cooling line 44 for electricity storage device.

In this way, the cooling water having increased in temperature by the electricity storage device 30 is cooled by the cooling air supplied into the heat exchanger upstream room 28 while circulating between the water jacket of the electricity storage device 30 and the radiator 42 for electricity storage device by the cooling pump 43 for electricity storage device. As a result, the electricity storage device 30 can be always kept in an appropriate temperature range by the cooling system 41 for electricity storage device.

Next, an explanation will be made of an operation of the cooling system 45 for inverter. The cooling system 45 for inverter forms a closed loop by the water jacket of the revolving electric motor 33, the water jackets of the first and second inverters 35, 37, the radiator 46 for inverter, the cooling pump 47 for inverter and the cooling line 48 for inverter. Accordingly, when the cooling pump 47 for inverter operates, the cooling water (coolant) in the water jackets of the first and second inverters 35, 37 and in the water jacket of the revolving electric motor 33 flow into the upper tank 46A of the radiator 46 for inverter. The cooling water having flowed into the upper tank 46A passes the heat radiation part 46C, and then flows into the lower tank 46B.

Since outside air (cooling air) is supplied into the heat exchanger upstream room 28 at this time, when this cooling air passes the heat radiation part 46C of the radiator 46 for inverter, the heat of the cooling water is released. Therefore, the cooling water the heat of which is released flows into the lower tank 46B of the radiator 46 for inverter. The cooling water the heat of which is released is supplied to the water jackets of the first and second inverters 35, 37 and the water jacket of the revolving electric motor 33 from the lower tank 46B through the cooling line 48 for inverter.

In this way, the cooling water having increased in temperature by the first and second inverters 35, 37 and the revolving electric motor 33 is cooled by the cooling air supplied into the heat exchanger upstream room 28 while circulating between the water jackets of the first and second inverters 35, 37 and in the water jacket of the revolving electric motor 33, and the radiator 46 for inverter by the cooling pump 47 for inverter. As a result, the first and second inverters 35, 37 and the revolving electric motor 33 can be always kept in an appropriate temperature range by the cooling system 45 for inverter.

In this case, the hydraulic excavator 1 according to the present embodiment includes the cooling system 41 for electricity storage device forming a closed loop by the radiator 42 for electricity storage device, the cooling pump 43 for electricity storage device and the cooling line 44 for electricity storage device. The cooling system 41 for electricity storage device is arranged in the heat exchanger upstream room 28 upstream of the heat exchanger 13 in the flow direction A of the cooling air, and is connected to a water jacket of the electricity storage device 30.

Thereby, the cooling system 41 for electricity storage device can independently cool the electricity storage device 30 aside from the other heat generators of the inverter device 34 and the like. Accordingly, the cooling system 41 for electricity storage device can set a cooling temperature optimal for cooling the electricity storage device 30 to efficiently cool the electricity storage device 30. As a result, since it is possible to always keep the electricity storage device 30 in an appropriate temperature range and always operate the electricity storage device 30 smoothly, a working lifetime of the electricity storage device 30 can be also improved.

Further, the entire cooling system 41 for electricity storage device can be configured in a compact manner by providing the radiator 42 for electricity storage device, the cooling pump 43 for electricity storage device and the cooling line 44 for electricity storage device in the heat exchanger upstream room 28. As a result, it is possible to enhance workability at the maintenance time to the entire cooling system 41 for electricity storage device, for example.

On the other hand, the cooling system 45 for inverter can cool the inverter device 34 aside from the electricity storage device 30 by using the radiator 46 for inverter. Accordingly, the cooling system 45 for inverter can set a cooling temperature optimal for cooling the inverter device 34 and the revolving electric motor 33 to efficiently cool them. As a result, the inverter device 34 can be kept in an appropriate temperature range to always operate the first and second inverters 35, 37 of the inverter device 34 smoothly.

In addition, the radiator 42 for electricity storage device and the radiator 46 for inverter are arranged upstream of the heat exchanger 13 in the flow direction A of the cooling air and in parallel in the flow direction A of the cooling air. Thereby, the cooling air before passing the heat exchanger 13 to be warmed can be supplied equally to the radiator 42 for electricity storage device and the radiator 46 for inverter. As a result, it is possible to efficiently cool the electricity storage device 30 and the first and second inverters 35, 37 of the inverter device 34, respectively.

In the hydraulic excavator 1 according to the present embodiment, the electricity storage device 30 is arranged in the heat exchanger upstream room 28 upstream of the heat exchanger 13 in the flow direction A of the cooling air supplied to the heat exchanger 13. The inverter device 34 is arranged in the front side (to the cab 6 side) from the electricity storage device 30. Therefore, in the present embodiment, for example as compared to a case where the electricity storage device and the inverter device are arranged to overlap up and down direction upstream of the heat exchanger in the flow direction of the cooling air as in the case of the conventional art, it is possible to prevent the electricity storage device 30 and the inverter device 34 from blocking the cooling air to supply more sufficient cooling air to the heat exchanger 13.

In addition, the radiator 42 for electricity storage device is arranged in the rear side of the radiator 46 for inverter (to the counterweight 7 side) in the heat exchanger upstream room 28. Therefore, the arrangement relation in the front-rear direction between the inverter device 34 and the electricity storage device 30 can be set to conform to the arrangement relation in the front-rear direction between the radiator 46 for inverter and the radiator 42 for electricity storage device. As a result, the cooling line 44 for electricity storage device in the cooling system 41 for electricity storage device and the cooling line 48 for inverter in the cooling system 45 for inverter can be arranged in order without overlapping to each other in up and down direction. As a result, it is possible to enhance workability upon performing a maintenance work to the cooling system 41 for electricity storage device and the cooling system 45 for inverter, for example.

According to the hydraulic excavator 1 in the present embodiment, the heat exchanger upstream room 28 is formed as the space upstream of the heat exchanger 13 in the flow direction A of the cooling air between the front partition plate 14A arranged in the front side of the heat exchanger 13 and the rear partition plate 14B arranged in the rear side of the heat exchanger 13. The radiator 42 for electricity storage device and the radiator 46 for inverter are arranged inside the heat exchanger upstream room 28. Thereby, a great deal of cooling air by the cooling fan 8A can be supplied to the radiator 42 for electricity storage device and the radiator 46 for inverter without waste to promote the cooling of the electricity storage device 30, and the first and second inverters 35, 37.

In the hydraulic excavator 1 according to the present embodiment, the connecting box 30B surrounded by the upper surface 30B1, the front side surface 30B2, the rear side surface 30B3, the left side surface 30B4 and the right side surface 30B5 is provided on the upper surface side of the casing 30A in the electricity storage device 30. The first cable connecting port 30D and the second cable connecting port 30E are provided on the front side surface 30B2 of the connecting box 30B, and the signal line connecting port 30F is provided on the rear side surface 30B3 of the connecting box 30B. Thereby, it is possible to prevent the cables 36, 38 connected to the first and second cable connecting ports 30D, 30E, and the signal line 40A connected to the signal line connecting port 30F from protruding upward from the upper surface 30B1 of the connecting box 30B and from blocking the cooling air supplied to the heat exchanger upstream room 28. As a result, the sufficient cooling air can be supplied to the radiator 42 for electricity storage device and the radiator 46 for inverter.

In the hydraulic excavator 1 according to the present embodiment, the lower end part 42D of the heat radiation part 42C in the radiator 42 for electricity storage device and the lower end part 46D of the heat radiation part 46C in the radiator 46 for inverter are arranged in a height position equal to or higher than a height of the upper surface 30B1 of the connecting box 30B as the upper end part of the electricity storage device 30.

Therefore, the cooling air supplied into the heat exchanger upstream room 28 by the cooling fan 8A is supplied to the heat radiation part 42C in the radiator 42 for electricity storage device and the heat radiation part 46C in the radiator 46 for inverter without interruption by the casing 30A and the connecting box 30B in the electricity storage device 30. As a result, it is possible to efficiently cool the inverter device 34 by the radiator 46 for inverter and the electricity storage device 30 by the radiator 42 for electricity storage device.

It should be noted that the embodiment is explained by taking a case where the inverter device 34 comprises the two inverters of the first and second inverters 35, 37, as an example. However, the present invention is not limited thereto, but, for example, the inverter may comprise a single inverter or three or more inverters.

The embodiment is explained by taking a case where the cooling system 45 for inverter cools the revolving electric motor 33 together with the inverter device 34, as an example. However, the present invention is not limited thereto, but may comprise another cooling system for cooling the revolving electric motor 33 aside from the inverter device 34.

The embodiment is explained by taking a case where the hydraulic excavator 1 of a crawler type equipped with the crawler belts 2D is used as the hydraulic-type working machine, as an example. However, the present invention is not limited thereto, but the present invention may be widely applied to various types of working machines such as a wheel-type hydraulic excavator equipped with wheels, a wheel loader, a forklift and a dump truck, and the like.

DESCRIPTION OF REFERENCE NUMERALS

2: Lower traveling structure (Vehicle body)
3: Upper revolving structure (Vehicle body)
4: Working mechanism
7: Counterweight
8: Engine
8A: Cooling fan
9: Hydraulic pump
12: Assist generator motor (First electric motor)
13: Heat exchanger
14A: Front partition plate
14B: Rear partition plate
28: Heat exchanger upstream room
30: Electricity storage device
30B: Connecting box
30B1: Upper surface
30B2: Front side surface (Side surface)
30B3: Rear side surface (Side surface)
30D: First cable connecting port
30E: Second cable connecting port
30F: Signal line connecting port
33: Revolving electric motor (Second electric motor)
34: Inverter device
35: First inverter
37: Second inverter
38: Cable
39: Control device
40A, 40B, 40C: Signal line
41: Cooling system for electricity storage device
42: Radiator for electricity storage device
42A, 46A: Upper tank
42B, 46B: Lower tank
42C, 46C: Heat radiation part
42D, 46D: Lower end part
43: Cooling pump for electricity storage device
44: Cooling line for electricity storage device
45: Cooling system for inverter
46: Radiator for inverter
47: Cooling pump for inverter (Other cooling pump)
48: Cooling line for inverter (Other cooling line)

The invention claimed is:

1. A hybrid-type working machine comprising:
an automotive vehicle body provided with a working mechanism in the front side;
a counterweight that is provided in the rear side of said vehicle body to act as a weight balance to said working mechanism;
an engine that is arranged in the front side of said counterweight and drives a hydraulic pump;
an electric motor that is driven by said engine to generate electric power or assists in a drive of said engine by supply of electric power thereto;
a heat exchanger for cooling a fluid including engine cooling water and/or hydraulic oil;
a cooling fan for supplying cooling air to said heat exchanger; and
an electricity storage device that is arranged in a heat exchanger upstream room upstream of said heat exchanger in a flow direction of the cooling air supplied to said heat exchanger and stores electric power or discharges the electric power, characterized in that:
said heat exchanger upstream room in the upstream side in the flowing direction of the cooling air supplied to said heat exchanger is provided therein with a radiator for electricity storage device that independently cools said electricity storage device using a coolant, a cooling pump for circulating the coolant, and a cooling line for connection between said cooling pump and said radiator for electricity storage device, wherein
said radiator for electricity storage device, said cooling pump and said cooling line configure a cooling system for electricity storage device, which is formed as a closed loop therewith, wherein
a second electric motor that is driven by electric power supplied from said electricity storage device aside from a first electric motor as said electric motor driven by said engine or stores regenerative electric power generated by a regenerative operation in said electricity storage device;
an inverter device including a first inverter for controlling an operation of said first electric motor and a second inverter for controlling an operation of said second electric motor; and
a radiator for inverter for cooling said first inverter and said second inverter, wherein
said radiator for inverter configures a cooling system for inverter together with another cooling pump for circulating the coolant and another cooling line for connection between said other cooling pump and said radiator for inverter, said cooling system for inverter being formed as a closed loop therewith.

2. The hybrid-type working machine according to claim 1, wherein
said radiator for electricity storage device in said cooling system for electricity storage device is arranged between said heat exchanger and said electricity storage device in the flow direction of the cooling air in said heat exchanger upstream room.

3. The hybrid-type working machine according to claim 1, wherein
said radiator for electricity storage device includes:
an upper tank into which a coolant to be cooled flows;
a lower tank into which the cooled coolant flows; and
a heat radiation part that is provided between said upper tank and said lower tank for radiating heat of the coolant into the cooling air, wherein
a lower end part of said heat radiation part in said radiator for electricity storage device is arranged in a height position equal to or higher than a height of an upper surface of said electricity storage device.

4. The hybrid-type working machine according to claim 1, wherein
said heat exchanger upstream room comprises a space that is surrounded by a front partition member extending in a left-right direction in the front side of said heat exchanger in a front-rear direction of said vehicle body and a rear partition member extending in the left-right direction along said counterweight in the rear side of said heat exchanger in the front-rear direction of said vehicle body and is formed upstream of said heat exchanger in the flow direction of the cooling air.

* * * * *